Aug. 18, 1953
E. R. ATKINS, JR
2,649,163
METHOD OF MEASURING THE CROSS
SECTIONAL AREA OF BOREHOLES
Filed June 23, 1949
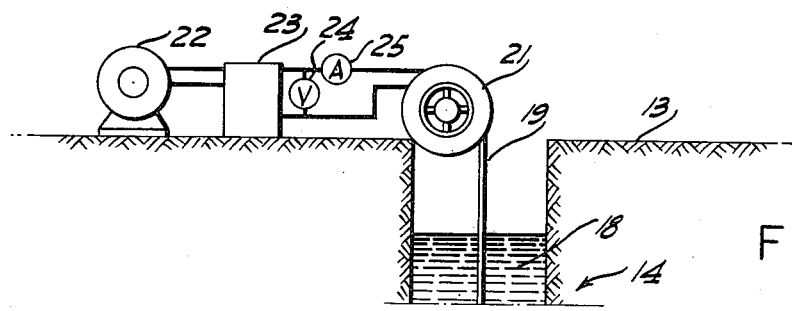
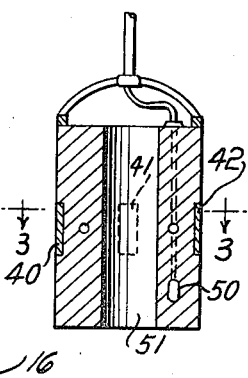
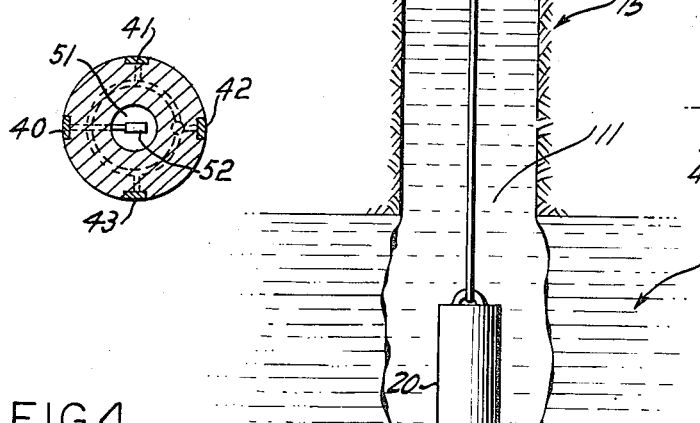
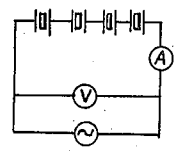
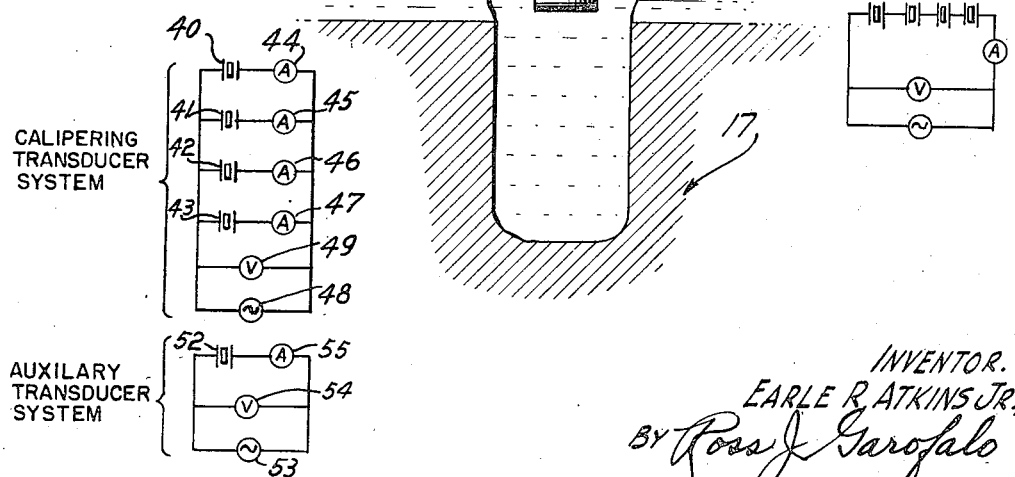
INVENTOR.
EARLE R. ATKINS JR.,
BY Ross J. Garofalo
ATTORNEY.

Patented Aug. 18, 1953

2,649,163

UNITED STATES PATENT OFFICE 2,649,163

METHOD OF MEASURING THE CROSS SECTIONAL AREA OF BOREHOLES

Earle R. Atkins, Jr., La Habra, Calif., assignor to Union Oil Company of California, Los Angeles, Calif., a corporation of California Application June 23, 1949, Serial No. 100,907

2 Claims. (Cl. 181—0.5)

This invention relates generally to sonic methods for evaluating and measuring the internal characteristics of well bores. More particularly, this invention relates to a method and apparatus for using the variations of the acoustical impedance of the bore hole as determined by corresponding variations of the loading characteristics of a sonic wave generator to locate zones of caving and other irregularities in a well bore and to estimate the mean diameter of the bore hole in the section being calipered.

Soft sands, shales and the like are often encountered during the drilling of well bores which cave into the bore hole. Many mechanical instruments have been devised to locate these zones of caving in order that cementing or other remedial measures may be used to prevent further loss of fluids from the bore hole, and further weakening of the neighboring formations. The operation of mechanical instruments of this type is time consuming and the instruments themselves have been subject to the usual mechanical troubles. More complex non-mechanical models which have been fashioned for the same purpose have heretofore employed elaborate and extensive equipment.

It is an object of this invention to provide a method and apparatus for locating zones of caving within a well bore by means of the acoustical impedance.

It is another object of this invention to provide a method and apparatus for indicating zones of caving within a well bore by means of the electrical loading characteristics of an electrically driven sonic wave generator.

It is another object of this invention to employ sonic vibrations for the calipering of a bore hole wherein the wave length of the vibrations are appreciably longer than the mean diameter of the bore hole in the section being calipered.

Briefly this invention comprises a new method for calipering a well bore wherein the loading characteristics of a sonic wave generator are used to estimate the mean diameter of the bore hole. The apparatus of this invention consists of four component parts, viz., a transducer, an electrical means for activating said transducer thereby generating low frequency sonic vibrations, a means for determining the electrical power requirement to sustain the activations of the transducer and a depth correlation mechanism. The transducer, which may comprise a suitable piezo-electric crystal, or preferably a multi-layered piezo-electric crystal unit or, alternatively, a magnetostrictive unit, is lowered into the bore hole during the calipering to some depth indicated by the depth indicating mechanism. An alternating current or any other suitable current whose voltage varies periodically with respect to time and at a relatively low frequency is impressed upon the transducer through leads running down the bore hole, the one enclosed in an insulated metal sheathed conductor cable and the other being provided by the metal sheath, thereby setting up low frequency sonic vibrations within and in the proximity of the transducer. The transducer and driving current are suitably inter-related so that the wave length of the principal vibrations in the bore hole fluids is appreciably larger than the mean diameter of the bore hole being calipered. The electrical power required to drive the transducer at a series of varying positions of depth is determined by suitable instruments at the earth surface. The power requirement for any given depth is then related to the mean diameter of the bore hole at that depth.

Attached Figure 1 illustrates one embodiment of this invention.

Figure 2 is a partial cross-sectional view of a multiple unit transducer.

Figure 3 is a sectional view of Figure 2 through the plane 3—3 showing an auxiliary transducer.

Figure 4 shows the electrical circuits for actuating the several transducer units and the auxiliary transducer of Figure 2.

Figure 5 shows an alternative electrical circuit for actuating several transducer units.

Referring now more particularly to attached Figure 1, bore hole 11 passes downwardly from earth surface 13 through successive earth strata 14, 15, 16 and 17. Strata 16 is relatively soft and subject to caving and it is desired to caliper the bore hole in the proximity of strata 16. Bore hole 11 is filled with a fluid medium 18 such as drilling fluid, connate water, fresh water, crude oil or other such liquid or combinations thereof.

Insulated conducting cable 19 contains an enclosed electrical lead not shown to provide one lead for supplying energy while the other lead is provided by the metal sheath of cable 19. Alternatively the second lead may be provided by a ground connection at the transducer and a corresponding ground connection at the earth surface 13. Cable 19 can be wound or unwound upon depth-indicating winding drums 21 to raise or lower transducer unit 20 within the bore hole, such movement being indicated by suitable means attached to winding drum 21 not shown.

Alternating current generator 22 and voltage regulator 23 are employed to furnish a constant voltage to the electrical system. The voltage is indicated by voltmeter 24 and the current flow or electrical load is measured by ammeter 25. The constant voltage electrical current is supplied to the insulated lead and the metal sheath of cable 19 by means of a suitable commutator arrangement on winding drum 21 whence it flows through the two electrical leads to transducer 20 within bore hole 11. Alternating current flow through transducer 20 sets up sonic vibrations of long wave length relative to the mean diameter of bore hole 11 in the proximity of strata 16.

Transducer 20 is raised or lowered in bore hole 11 by means of winding drum 21 thereby changing the acoustical impedance of the surroundings of transducer 20 and effecting changes in the electrical power required to sustain actuation of the transducer at each of the new positions of depth. At constant voltage the changes in the power requirement is indicated proportionally by the readings of ammeter 25. In the preferred mode of operation ammeter 25 is an indicating-recording meter which records the current magnitude and fluctuations thereof on a tape or strip of paper concurrently with the recording of a similar recording of the relative depth of the transducer in the bore hole.

The dissipation of the vibrational energy generated by the transducer into the surrounding liquid medium is principally determined by the characteristics, i. e. the mean diameter, of the bore hole in the proximity of the transducer. Where the transducer is relatively far from either the bottom or top of the bore hole the acoustical impedance of the bore hole is proportional to the mean cross-sectional area of the bore hole in the proximity of the transducer. Accordingly, as the transducer is moved upward or downward within the bore hole the acoustical impedance and hence the electrical requirement of the transducer will vary in proportion to the mean cross-sectional area.

The relationship between the energy requirements of the transducer and the mean diameter is most easily determined by empirical calibration. The energy requirement is approximately proportional to the mean cross-sectional area of the bore hole while the latter is in turn proportional to the square of the mean diameter. In using the foregoing approximations the loading is first determined at the desired frequency and in the presence of the particular bore hole fluid in a section of the bore hole of known mean diameter, e. g. in a section not subject to caving. Where $L_0$ is the observed electrical load when the transducer is in a section having a known mean diameter $D_0$, and $L_1$ is the observed electrical loading in the presence of a section having an unknown mean diameter $D_1$, the unknown mean diameter can be determined from the following equation:

$$\frac{D_1}{D_0} = \sqrt{\frac{L_1}{L_0}}$$

In an alternative method for calibrating the apparatus the transducer is introduced into the bore hole and the electrical loading is determined in the presence of a particular fluid in a number of sections of the bore hole for which the mean diameters are known. An empirical curve can then be prepared relating the mean diameter to the electrical loading under the particular set of conditions.

The transducer of this invention may be any suitable magnetostrictive or piezo-electric unit for converting low frequency electric current into sonic vibrations of long wave length. In one modification of the invention the transducer may comprise a bank of thin sheets of Rochelle salt with interposed conductors between the sheets, alternating conductors being connected in parallel and each of the two sets of conductors being connected to the two leads supplying electrical current and with the electrical polarity of the two leads being alternatingly reversed. Laminae of other piezo-electric crystals can be employed similarly. In another modification of the invention the transducer may consist of, for example, pure nickel rod or other such magnetostrictive metal suitably wound with insulated conducting coils, the latter upon being energized with suitable electrical means thereby setting up vibrations in the ends of the rod.

In the simplest case the radiating surface of the transducer is suspended vertically within the bore hole without regard to the orientation of the exposed vibrating surface of the transducer with respect to the points of the compass.

In another method for calipering the bore hole the radiating surface of the transducer is placed so as to face the top of the bore hole. Measurements are normally made at depths considerably removed from the top of the bore hole. Where the radiating surface of the transducer faces the top of the bore hole and is at the same time considerably removed therefrom, such that for practical purposes the distance is infinity, the end effect of the borehole is eliminated and the acoustic impedance is then almost wholly dependent upon the characteristics of the bore hole wall and independent of the distance to the top. In order to minimize vibrational radiation toward the bottom of the hole a flat or slightly concave reflector or suitable absorber is suspended below the transducer in the bore hole. Where the transducer is thus positioned to face the top, accurate measurements can be made to within a few feet of the bottom of the bore hole.

Referring now more particularly to Figures 2, 3 and 4, the transducer may comprise several separate vibrating or radiation surfaces arranged in radially symmetrical fashion so that radiating surfaces of each of the transducer units, 40, 41, 42 and 43 respectively, face the periphery of the bore hole at regularly spaced angular intervals. This composite type of transducer will generally afford greater accuracy in measuring bore holes which deviate considerably from round. Multiple unit transducers can be coupled in series, as shown in Figure 5, or parallel among themselves, as shown in Figure 4 and all actuated by a single electrical supply 48, or alternatively each unit can be actuated by its individual power supply. The loading is then determined separately for each unit employing ammeters 44, 45, 46, and 47 and voltmeter 49 according to the method described hereinbefore in connection with Figure 1. In such a case each unit may be calibrated separately or otherwise.

Where multiple unit transducers are employed, it is often desirable to equip the transducer system with a suitable orientation indicating device such as a photographically recording compass in order that the relative positions of each transducer unit within the bore hole is indicated at the earth surface. By estimating the cross-sectional area with each of a series of units of known orientation with respect to the compass 50 it becomes possible to estimate the probable direction of the caving into the bore hole, should such information be desired.

Although in the foregoing illustration of this invention the power requirement has been determined from the varying current flow while operating at a constant voltage, other alternative methods may be employed. Thus the power can be determined by operating at a constant current flow and measuring the changes in voltage. Alternatively, a wattmeter may be employed to indicate the power requirements of the transducer directly. In any of the foregoing cases, however, it is desirable that the instrument be of the indicating-recording type rather than of the simple indicating type.

The frequency of the vibration of the transducer should be such that the wave length of such vibration in the fluid medium is appreciably longer than the mean diameter of the bore hole in the section to be measured. Accordingly, the frequency of the vibration should normally be within the range of about 10 to 600 cycles per second and should preferably be within the range of about 30 to 200 cycles per second. Such vibrations are in the low sonic range.

The electrical means for driving the transducer comprises a modulated electrical current whose voltage is varied in amplitude periodically with respect to time, such variations defining the frequency of such current. The frequency of the current will normally be the frequency of the desired sonic vibration. In some instances the current frequency may be a small integral multiple of the desired sonic frequency.

Suitable electrical currents comprise simple sinusoidal alternating currents, produced by a suitable generator, direct current having an interrupted flow such as is obtained by feeding a D. C. current to a vibration-interrupter, direct current with an alternating current component such as is obtained by the electrical addition of an A. C. current to a D. C. current as well as numerous other impulse type currents having periodical wave patterns, e. g. saw-tooth, square-wave and other non-sinusoidal waves. In using any of the foregoing types of currents the peak magnitude in a given polarity will generally be repeated the same number of times per second as the frequency of the desired sonic vibration.

Where only approximate measurements are desired small changes in the temperature and composition of the surrounding drilling fluid, or other such fluid, as compared with the fluid used during the calibration of the instrument can be neglected. Under certain circumstances, such as when large temperature changes are encountered throughout the bore hole or when large volumes of oil or connate water are flowing into the borehole, it is desirable to correct for such changes.

Referring again more particularly to Figures 2, 3 and 4, in the preferred method for correcting the measurements for temperature and compositional changes a chamber 51 is included within the body of the transducer unit, or a separate cell is attached to or fitted near the transducer. The chamber 51 or cell admits fresh fluid continuously as the transducer ascends or descends the bore hole and measures the changing acoustical properties of the fluid. In one method for measuring such properties a small auxiliary transducer 52 is located in a straight section of cylindrical test chamber 51 through which the bore hole fluid passes.

A separate auxiliary voltage from source 53 is supplied to the auxiliary transducer 52 of a frequency such that the wave length of the vibrations emitted by the auxiliary transducer 52 is larger relative to the diameter of the test chamber 51. In some cases the voltage and frequency thereof may be of the same type as for the calipering transducer. The power requirement $P_M$ of the calipering transducer and the power requirement $P_A$ of the auxiliary transducer 52 are separately determined when they are located in a bore hole section of known diameter such that the fluids surrounding both transducers are identical, whereby both transducers are calibrated. When the fluid medium is changed, the power required to sustain the auxiliary transducer 52 will be increased or decreased by a definite percentage, e. g. X%, depending only upon the acoustical properties of the new fluid relative to the calibrating fluid, the diameter of the test chamber 51 being constant throughout. The actual power requirement of the calipering transducer, which is measured by means of voltmeter 54 and ammeter 55, must be increased or decreased by the same percentages, e. g. X%, in order to correct for changes in the acoustical impedance of the fluid relative to the calibrating fluid. After the corrected power requirement is known the calibration data for the calibrating fluid can be used throughout, such data being obtained by the previously described methods.

In one modification a separate record of the power requirement of the auxiliary transducer 52 during the calibration and the calipering is made simultaneously with the recording of the power requirement of the calipering transducer. At any point of the calipering the percentage change of the power requirement of the auxiliary transducer 52 relative to that of the calipering transducer is determined and the percentage is used to correct the power requirement of the calipering transducer at that point in order to correspond to the particular calibration liquid present at that point. In another modification the percentage correction can be applied electrically to vary the observed power of the calipering transducer likewise so that a single automatically corrected power record for the calipering transducer is obtained.

It is apparent that many modifications of this invention may be made by those skilled in the art without departing from the spirit and scope of the following claims:

I claim:

1. A method for determining the cross-sectional dimensions of an elongated bore-hole containing a bore-hole liquid, said bore-hole traversing substantial cross-sectional irregularities, which comprises axially sweeping a vertical sector of said bore-hole with a plurality of transducers positioned in radially symmetric fashion around the axis of said bore-hole and facing the walls of said bore-hole, said transducers being electrically actuated at a plurality of levels within said sector to produce low-frequency sonic vibrations, said sonic vibrations being radiated from said transducers into said liquid and dissipated therein, separately measuring the electrical power requirements for actuating each of said transducers at each of said levels, and correlating said electrical power requirements by direct proportionation to indicate (1) differences in cross-sectional area of said bore-hole between each of said levels, and (2) the approximate cross-sectional shape of said bore-hole at each of said levels.

2. A method according to claim 1 which includes the step of determining the orientation of said plurality of transducers with respect to a compass, whereby the said cross-sectional shape of said bore-hole as determined at each of said levels is also oriented compass-wise.

EARLE R. ATKINS, Jr.

References Cited in the file of this patent

UNITED STATES PATENTS

| Number | Name | Date |
| --- | --- | --- |
| 1,935,078 | Cavins | Nov. 14, 1933 |
| 1,980,100 | Schlumberger | Nov. 6, 1934 |
| 2,156,052 | Cooper | Apr. 25, 1939 |
| 2,200,476 | Mounce | May 14, 1940 |
| 2,244,484 | Beers | June 3, 1941 |
| 2,275,736 | Cloud | Mar. 10, 1942 |
| 2,333,688 | Shepard | Nov. 9, 1943 |
| 2,350,371 | Smith | June 6, 1944 |
| 2,530,971 | Kean | Nov. 21, 1950 |